United States Patent [19]

Atkinson

[11] 4,434,810
[45] * Mar. 6, 1984

[54] BI-DIRECTIONAL PRESSURE RELIEF VALVE

[75] Inventor: Gordon E. Atkinson, Yellow Springs, Ohio

[73] Assignee: Vernay Laboratories, Inc., Yellow Springs, Ohio

[*] Notice: The portion of the term of this patent subsequent to Jul. 27, 1999 has been disclaimed.

[21] Appl. No.: 380,971

[22] Filed: May 24, 1982

Related U.S. Application Data

[63] Continuation-in-part of Ser. No. 168,981, Jul. 14, 1980, Pat. No. 4,341,239.

[51] Int. Cl.³ ............................................. F16K 17/18
[52] U.S. Cl. .................................. 137/493; 137/846; 137/847; 137/849
[58] Field of Search ............... 137/493, 844, 846, 847, 137/849; 222/490, 494

[56] References Cited

U.S. PATENT DOCUMENTS

| | | |
|---|---|---|
| 996,588 | 6/1911 | Kennedy ........................... 37/846 X |
| 1,051,554 | 1/1913 | Champion ....................... 222/490 X |
| 2,569,073 | 9/1951 | Robinson ......................... 222/490 X |
| 2,674,318 | 4/1954 | Sutliff .............................. 137/849 X |
| 3,155,110 | 11/1964 | Hoffman . |
| 3,159,176 | 12/1964 | Russell et al. . |
| 3,245,428 | 4/1966 | Klimak ................................. 137/493 |
| 3,504,699 | 4/1970 | Grise . |
| 3,517,682 | 6/1970 | Smith . |
| 3,822,720 | 7/1974 | Souza .................................. 137/846 |
| 4,181,145 | 1/1980 | Mitchell . |
| 4,341,239 | 7/1982 | Atkinson ............................. 137/493 |

FOREIGN PATENT DOCUMENTS

| | | | |
|---|---|---|---|
| 1366717 | 9/1974 | United Kingdom ................ 137/849 |
| 145824 | 6/1962 | U.S.S.R. ............................... 137/493 |

*Primary Examiner*—Robert G. Nilson
*Attorney, Agent, or Firm*—Biebel, French & Nauman

[57] ABSTRACT

A bi-directional pressure relief valve includes a cylindrical main body portion defining a flow path through the valve and terminating in an asymmetrical lip portion having a curved contour about an axis of curvature extending perpendicularly to the flow path and a linear contour which is substantially normal to the curved contour. The lip portion has a normally closed slit formed through it and expands to open the slit to permit flow in one direction in response to pressure differentials across the lip portion above a first pressure differential, regains its undeformed shape to close the slit and check flow at pressure differentials below the first differential and above a second pressure differential, and collapses in a predictable and repeatable manner to open the slit to permit flow in an opposite direction at pressure differentials below the second pressure differential. A preferred embodiment includes an annular flange formed about the lip portion which facilitates the mounting of the valve in a conduit. If desired, the pressures at which flow can occur through the valve may be increased by providing the valve with stiffening ribs projecting radially outwardly of the main body portion.

14 Claims, 5 Drawing Figures

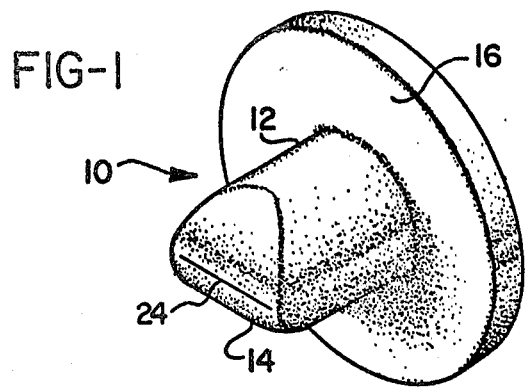
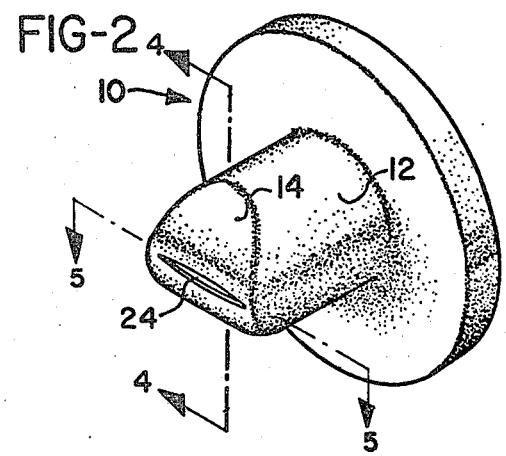
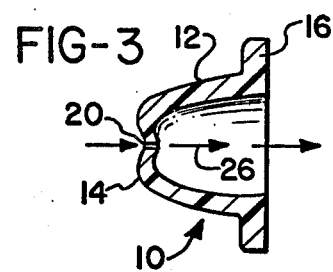
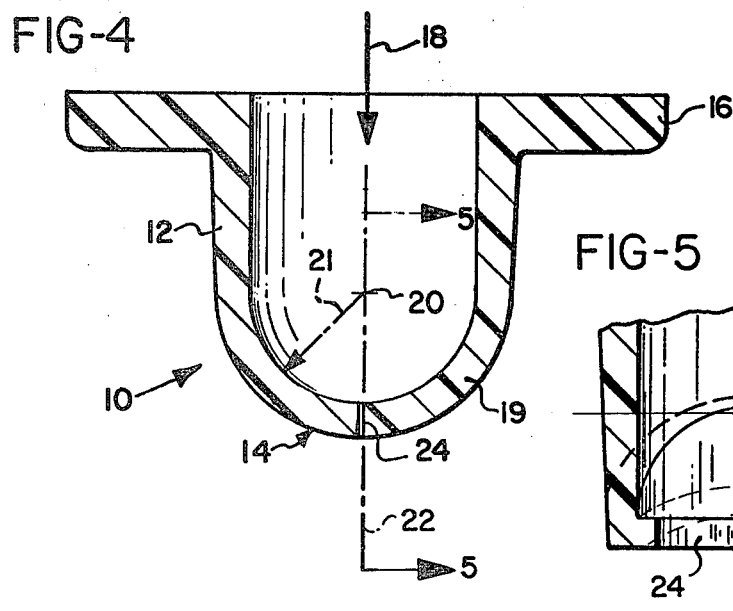
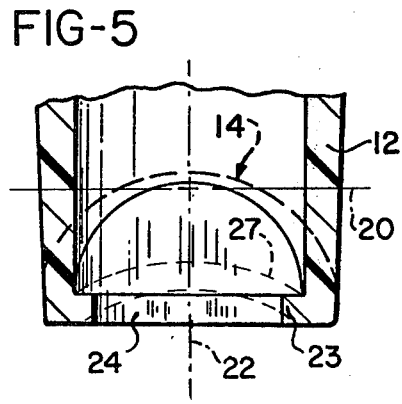

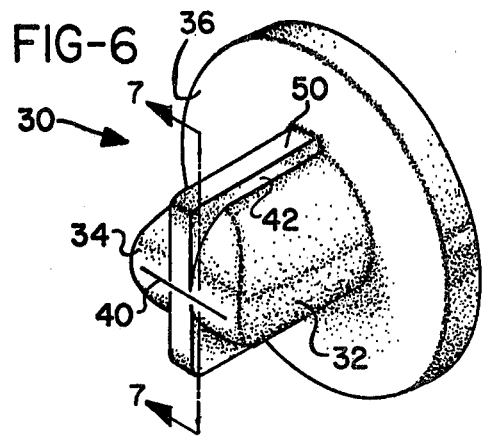
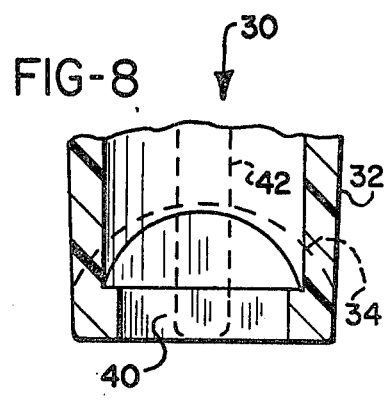
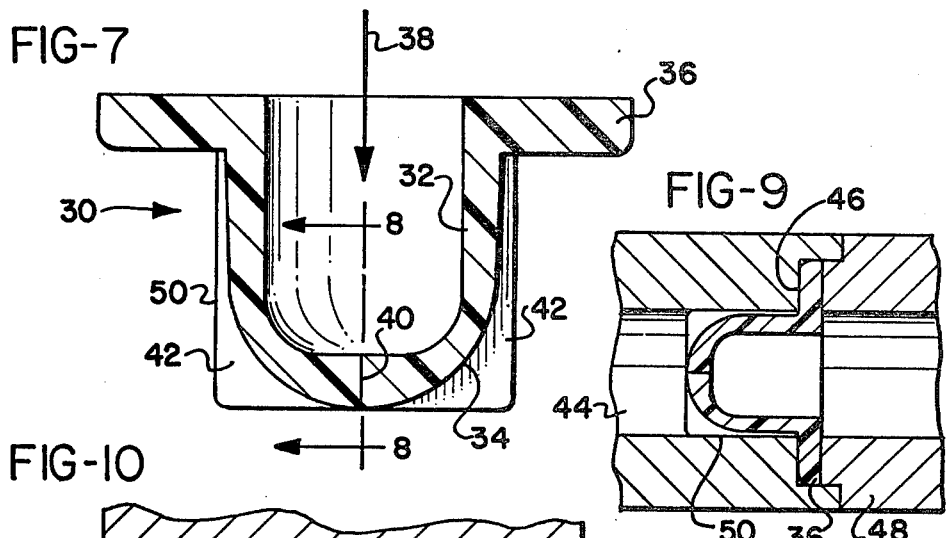
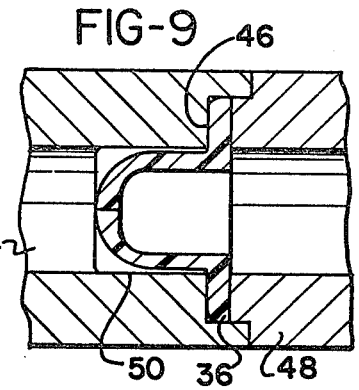
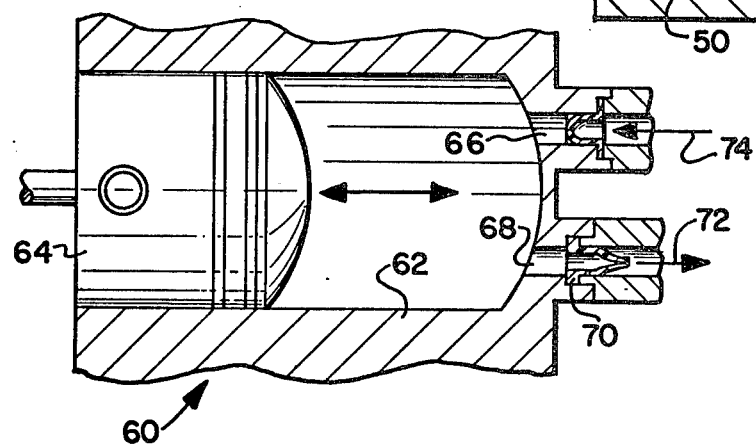

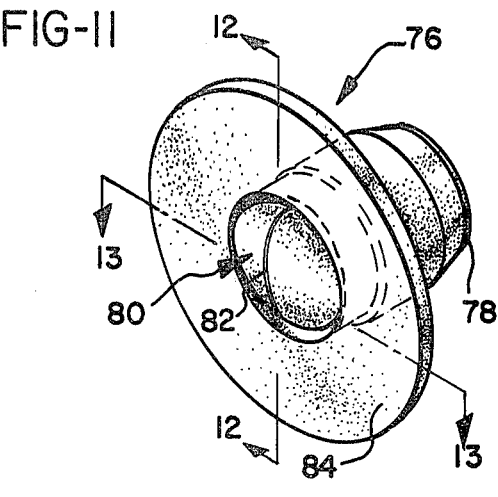
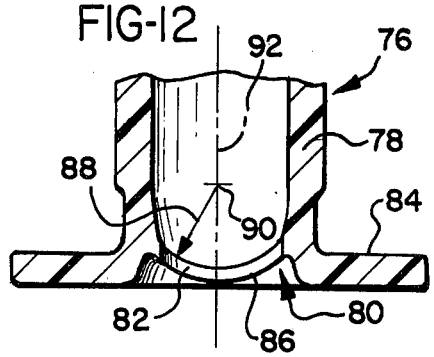
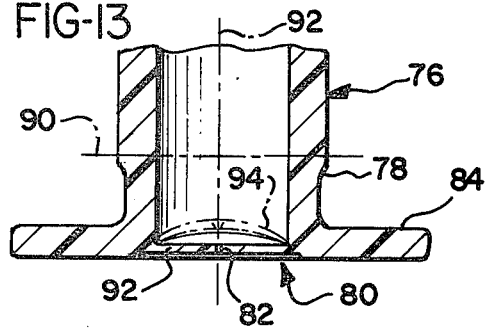
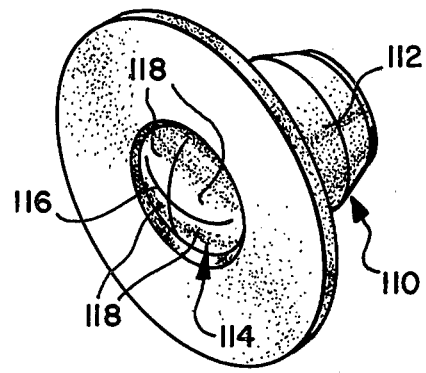
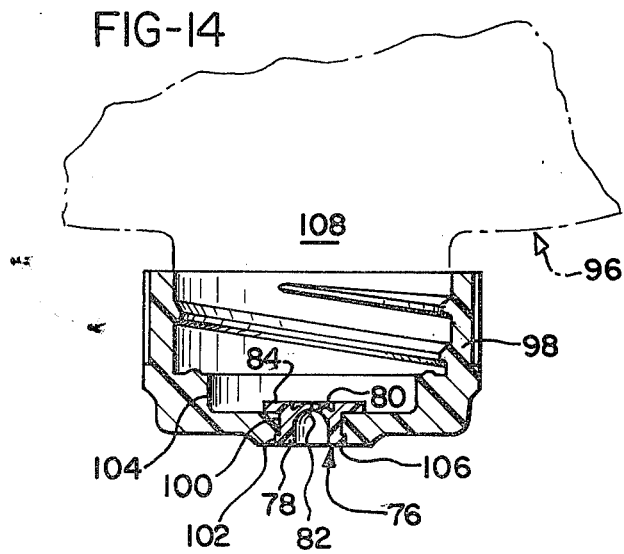

BI-DIRECTIONAL PRESSURE RELIEF VALVE

CROSS-REFERENCE TO RELATED APPLICATION

This application is a continuation-in-part of U.S. application Ser. No. 168,981, filed July 14, 1980, now U.S. Pat. No. 4,341,239.

BACKGROUND OF THE INVENTION

1. Field of the Invention

The present invention relates to pressure relief valves, and in particular, pressure relief valves permitting bi-directional flow responsive to changes in pressure differential.

2. Prior Art

One-way check valves of the so called "duckbill" type generally incorporate a hollow cylindrical body terminating in a duckbill which permits flow in one direction but checks flow in the opposite direction.

In some environments it is desirable to not only permit flow in one direction and check flow in the opposite direction, but to also provide for reverse flow or pressure relief when the flow pressure in the opposite direction exceeds a certain value.

U.S. Pat. No. 3,155,110 discloses various embodiments of check-relief valves including one that incorporates a coil spring and another which utilizes collapsible lugs or feet. In both versions, reverse flow is provided by an axial shifting of the entire valve body.

U.S. Pat. No. 3,159,176 discloses a check-relief duckbill valve in which reverse flow is accomplished, not by axial movement of the valve, but by the provision of a flexible umbrella portion which lifts off its seat at reverse flow pressures in excess of some value to permit reverse flow around the outside of the body of the valve.

Obviously the use of a separate coil spring makes the valve assembly more complicated and expensive, while it is often impractical or even impossible to utilize a valve which relies upon axial movement of the entire valve or flow around the outside of the valve body to provide reverse flow.

U.S. Pat. No. 4,181,145 discloses a two-way check valve comprising a valve body having an opening covered by a flexible wall such that it defines two slits. The walls of the opening are sloped such that a forward flow pressure across the opening causes forward flow through a first slit while the other remains closed, and reverse flow pressure causes flow in a reverse direction through the second slit while the first remains closed. Thus, this two-way check valve actually consists of two one-way valves oriented to permit flow in opposite directions.

SUMMARY OF THE INVENTION

The present invention provides an improved bi-directional pressure relief valve which utilizes a single valve opening, yet eliminates the necessity of separate coil springs, axial movement of the entire valve for reverse flow around the valve body, and permits overpressure relief or reverse flow through the hollow, cylindrical main body portion of the valve.

Specifically, the valve includes a hollow, cylindrical main body portion made of an elastomeric material and terminating in a radially asymmetrical lip portion having a curved contour about an axis of curvature extending perpendicularly to the flow path through the main body portion and a substantially linear contour which is substantially normal to the curved contour. The lip portion defines a normally closed slit formed through it.

The valve is shaped such that, if the forward flow pressure within the body portion is increased above a first predetermined pressure level, the lip portion expands to open the slit, permitting forward flow from the body portion through the lip portion. A reverse flow pressure at a second predetermined pressure level, preferably greater than the first predetermined pressure level, does not distort the lip portion sufficiently to open the slit and permit reverse flow through the lip portion so there is no flow through the valve under these conditions. At a reverse flow pressure greater than the second predetermined pressure level, the lip portion collapses, thereby opening the slit and permitting reverse flow. Thus, the valve responds to flow pressure in both a forward and a reverse direction at predetermined pressure levels.

The lip portion collapses in response to reverse flow pressures to permit reverse flow through the slit, yet will regain its uncollapsed shape throughout repeated cycles of use. Due to the asymmetric shape of the lip portion, the center of the lip portion is less able to bear the pressure exerted against the outer surface of the lip portion than the sides adjacent the wall of the main body portion. As the reverse flow pressure increases above the second predetermined pressure level, thus placing a load on the lip portion, the center of the lip portion bulges along the linear contour until the lip portion collapses and opens the slit. The magnitude of the pressure differential required for this reverse flow is greater than that required for forward flow from the body portion through the lip portion.

For a given value, the pressure differential at which the lip portion distorts to permit flow through the slit may be varied by varying the orientation of the slit. For example, a valve having a slit extending along the curved contour of the lip portion would permit flow at a smaller threshold pressure differential than the same valve having a slit oriented along the linear contour. Two slits, intersecting to form a cruciform shape, may be utilized instead of a single linear slit to form a valve having a lip portion which permits flow at much lower pressures than for valves having a single slit.

Preferably the curved contour of the lip portion has a substantially constant radius of curvature and the normally closed slit through the lip portion has a length less than the diameter of the cylindrical main body portion and is positioned to intersect a central longitudinal axis of the main body portion. Also, preferably, the cylindrical main body portion is provided with a radially outwardly projecting flange to facilitate mounting the valve.

The entire valve is molded in one piece from an elastomeric material. For purposes of illustration a silicone rubber may be used having a Shore A Durometer rating of about 45, and typical operating pressure differentials across the lip portion for an installation may be about 3-4 psi for opening the normally closed slit for flow outwardly from the main body portion and a reverse flow pressure differential of about 10 psi for opening the slit to permit reverse flow.

While the pressures at which the valve operates can be controlled to a great extent by the selection of the material of which the valve is molded and the orientation of the slit, operating pressures can also be increased through the use of stiffening ribs molded integrally with the valve. In a preferred embodiment, the ribs are coextensive with the main body portion and project radially outwardly from it at diametrically opposed positions. With a construction of this type, it will be mainly the pressure differential across the lip portion for forward flow from the main body portion through the lip portion that is increased, although generally the pressure differential required for reverse flow will also be increased somewhat.

Accordingly, it is an object of the present invention to provide a bi-directional pressure relief valve that permits forward and reverse flow under predictable and repeatable conditions; that can be made of a simple, one-piece construction; and that operates to permit forward and reverse flow at different forward and reverse flow pressures.

Other objects and advantages of the invention will be apparent from the following description, the accompanying drawings and the appended claims.

BRIEF DESCRIPTION OF THE DRAWINGS

FIG. 1 is a perspective view of a valve in accordance with the present invention showing the slit in its normally closed position;

FIG. 2 is a view similar to FIG. 1, but showing the slit open for flow in a first direction;

FIG. 3 is a partial cross-sectional view showing the valve in its pressure relief configuration;

FIG. 4 is a cross-sectional view taken on line 4—4 of FIG. 2;

FIG. 5 is a partial cross-sectional view taken on line 5—5 of FIG. 2;

FIG. 6 is a view similar to FIG. 1 but showing a second preferred embodiment of the invention;

FIG. 7 is a cross-sectional view taken on line 7—7 of FIG. 6;

FIG. 8 is a partial cross-sectional view taken on line 8—8 of FIG. 7;

FIG. 9 is a view showing a valve of the present invention installed in a flow port;

FIG. 10 illustrates the valve of FIG. 6 in an exemplary environment;

FIG. 11 is a view similar to FIG. 1 but showing a third preferred embodiment of the invention;

FIG. 12 is a cross-sectional view taken on line 12—12 of FIG. 11;

FIG. 13 is a partial cross-sectional view taken on line 13—13 of FIG. 11;

FIG. 14 illustrates the valve of FIG. 11 in an exemplary environment; and

FIG. 15 is a view similar to FIG. 1 but showing a fourth embodiment of the invention.

DESCRIPTION OF THE PREFERRED EMBODIMENTS

With reference initially to FIGS. 1 through 5 of the drawings, it will be seen that a bidirectional pressure relief valve 10 in accordance with the present invention includes a hollow, cylindrical, main body portion 12 terminating at one end in a lip portion 14 and having a radially outwardly projecting flange 16 at an opposite end. The cylindrical main body portion defines a flow path 18 through the valve, as best seen in FIG. 4 of the drawings. The valve 10 preferably is made of a flexible, elastomeric material.

When viewed as in FIG. 4, the lip portion 14 has a curved contour 19 which curves about an axis of curvature 20 and preferably has a constant radius of curvature 21. The axis of curvature 20 preferably lies on the central longitudinal axis 22 of the main body portion 12.

When viewed as in FIG. 5, the lip portion 14 has a linear contour 23 oriented substantially normal to the central longitudinal axis 22 and parallel to the axis of curvature 20. Thus, the lip portion presents a radially asymmetrical profile about the central longitudinal axis 22, having a curved contour 19 in the plane shown in FIG. 4, and a linear contour 23 in the plane shown in FIG. 5; the two planes preferably being normal to each other and containing the central longitudinal axis 22.

A slit 24 is formed in the lip portion 14 and extends along the linear contour 23. The slit 24 is normally closed and has a length less than the diameter of the main body portion 12.

With the above described construction the slit 24 will normally be closed, as seen in FIG. 1 of the drawings. As a forward flow pressure within the valve body 12 increases above ambient, thereby creating a pressure differential across the lip portion 14 above some preselected value, the lip portion 14 expands in response to the pressure differential, thereby opening the slit 24 as seen in FIG. 2 of the drawings. The open slit 24 allows forward flow through the valve 10 in the direction indicated by the arrow 18 in FIG. 4 of the drawings. However, when reverse flow pressure is applied to the external surface of the valve 10 or when the forward flow pressure is reduced, thereby reducing the pressure differential across the lip portion 14, the slit 24 will again close, checking flow through the valve.

Flow will continue to be checked until some preselected reverse flow pressure is reached in which the external pressure exceeds the internal pressure within the valve 10, at which point the curved lip portion 14 collapses inwardly, as seen in FIG. 3 of the drawings, allowing the slit 24 to open and permitting reverse flow through the valve in the direction indicated by the arrows 26 in FIG. 3 of the drawings. The curved contour 19 tends to resist inward collapse of the lip portion 14 and opening of the slit 24 due to its domed shape. However, since the lip portion 14 includes a substantially linear contour 23 which is unsupported at its center, a negative pressure differential causes the lip portion to bulge inwardly, assuming a contour 27 shown in phantom in FIG. 5, forcing the slit 24 open and facilitating the collapse of the lip portion. Experimentation has shown that this asymmetric shape of the lip portion 14 provides a valve 10 that collapses to permit reverse flow in a predictable and repeatable manner.

While the material of which the valve is constructed can affect to a great extent the pressures at which the valve will open for normal flow and relief for reverse flow, operating pressures can also be increased by providing stiffening means as shown in FIGS. 6, 7 and 8 of the drawings.

Thus, a valve 30, similar to the valve 10, includes a cylindrical main body portion 32, a radially asymmetrical lip portion 34, a radially outwardly extending flange 36 and a normally closed slit 40, which opens to permit flow in the direction of the arrow 38. However, stiffening means is provided in the form of ribs 42 formed integrally with the main body portion 32. While the form, number and arrangement of the ribs can be varied as desired, the stiffening means can conveniently be formed as a pair of diametrically positioned, radially projecting ribs 42 extending co-extensively with the cylindrical main body portion 32.

As seen in FIG. 9 of the drawings, a valve of the present invention can be installed in a flow port 44 with the flange 36 overlying a shouldered portion 46 and being held in place by an end of a conduit 48. While the valve 30 is shown for purposes of illustration in FIG. 9, and also in FIG. 10 to be discussed below, it will be apparent that the valve 10 can be installed in a similar fashion.

Additionally, it will usually be preferable to form the valve 10 with an outside diameter slightly greater than the inside diameter of the opening within which it is received to provide a slight force fit, while in the case of the valve 30 the outside diameter of the valve, measured from the outer surfaces 50 of the ribs 42, will preferably be slightly greater than the inside diameter of the opening within which the valve is received.

For purposes of illustration a pump 60 is shown in FIG. 10 of the drawings incorporating a valve of the present invention. The pump 60 includes a cylinder 62 slidably receiving a piston 64 and having intake and outlet openings 66 and 68, respectively. In the outlet opening 68 a conventional, one-way duckbill valve 70 can be installed for permitting flow in the direction of the arrow 72 while checking flow in the opposite direction.

At the inlet opening 66 a valve of the present invention, the valve 30 being shown, although the valve 10 could also serve this function, is installed to permit flow in the direction of the arrow 74 while normally checking flow in the opposite direction. However, should pressure build up to a value greater than that desired for flow through the outlet 68, the valve of the present invention will relieve in the manner shown in FIG. 3 of the drawings, preventing damage to components connected to the outlet 68 of the pump.

The performance characteristics of the invention can be altered by changing the orientation of the slit, as shown in FIGS. 11, 12, and 13. A valve 76 is similar in construction to the valve 10 (FIGS. 1-5) in that it includes a cylindrical main body portion 78 which terminates in a radially asymmetrical lip portion 80 which defines a slit 82. The valve 76 also includes an outwardly extending flange 84 which is shown adjacent the lip portion 80, although it could be positioned anywhere along the length of the body portion 78.

Like the valve 10, the lip portion 80 of the valve 76 includes a curved contour 86 in the plane shown in FIG. 12, having a constant radius of curvature 88 from an axis of curvature 90, and substantially linear contour 92 in the plane shown in FIG. 13; the planes being normal to each other and containing the central longitudinal axis 94 of the body portion 78. However, the valve 76 can be distinguished from the valves 10 and 30 (FIGS. 1-10) discussed previously in that the slit 82 extends along the curved contour 86.

The valve 76 will have substantially the same operating characteristics for forward flow; that is, the lip portion 80 will expand slightly to permit the slit 82 to open at about the same pressure differential as if the slit extended along the linear contour 92. However, lip portion 80 of the valve 76 collapses to permit reverse flow at a lower reverse flow pressure. Since the slit 82 extends along the curved contour 86, it is opened to permit reverse flow with less deflection, as the collapsed contour 94, shown in phantom in FIG. 13, indicates.

As shown in FIG. 14 of the drawings, a valve 76 of the present invention may be installed in a vessel such as a squeeze bottle 96 containing a liquid substance. Bottle 96 is preferable made of polyethylene and includes a cap 98 defining an orifice 100 with countersinks 102, 104. The valve 76 is fitted within the orifice 100 such that its flange 84 is supported within countersink 104 and main body portion 78 includes a second flange 105 supported within countersink 102.

The valve 76 is oriented such that the lip portion 80 presents a convex profile to the interior 108 of the bottle 96. The main body portion 78 communicates with the ambient.

To operate the bottle 96, the user squeezes the bottle, thereby increasing the pressure within the interior 108 and the pressure of the liquid against the lip portion 80. When this pressure reaches a predetermined level, the lip portion 80 collapses, permitting the liquid to pass through the open slit 82, along the main body portion 78, and into the ambient. As the user releases the bottle 96, the inherent resiliency of the bottle urges it to expand and resume its original shape thereby lowering the pressure of the interior 108 below ambient. When the ambient pressure is sufficiently above the interior 108 pressure, the lip portion expands inwardly to open the slit 82 and permit air to enter the bottle 96.

Once the bottle has resumed its original, unsqueezed shape, and the interior pressure is sufficiently close to ambient, air flow ceases and the slit 82 closes. The valve preferably is positioned at the bottom of the bottle 96 so that the liquid contents bears upon the lip portion. Thus, when the bottle 96 is squeezed, only liquid passes through the valve 76, instead of only part liquid and part air. In such a configuration, the valve 76 should be sufficiently stiff to prefent flow from the bottle 96 until the bottle is squeezed by the user.

Alternately, a valve of the invention may utilize a plurality of intersecting slits, as shown, for example, in FIG. 15. A valve 110 has a main body portion 112 terminating in an asymmetrical lip portion 114 similar in shape to lip portions 14 and 86 (FIGS. 1 and 11). A slit 116 is cruciform in shape and is formed through the lip portion 116, thus dividing it into four flaps 118. Such a valve permits forward end reverse flow at relatively small pressure differential since each flap 118 is more responsive to pressure differential than a lip portion divided by a single slit.

From the above it will be seen that the present invention provides a bi-directional pressure relief valve which avoids the necessity of separate components such as springs, axial shifting of the entire valve and flow around the outside of the valve body.

While the forms of apparatus herein described constitute preferred embodiments of the invention, it is to be understood that the invention is not limited to these precise forms of apparatus, and that changes may be made therein without departing from the scope of the invention.

What is claimed is:

1. A bi-directional pressure relief valve comprising:
   a substantially cylindrical main body portion having a central longitudinal axis and defining a flow path through said valve;
   said cylindrical main body portion terminating at one end thereof in a lip portion;
   said lip portion having a curved contour about an axis of curvature extending substantially perpendicularly to and intersecting said central longitudinal axis;

said lip portion having a linear contour perpendicular to said central longitudinal axis such that said lip portion is radially asymmetrical about said central longitudinal axis;

at least one normally closed slit formed in said lip portion; and said main body and lip portions being formed of elastomeric material such that said slit opens to permit flow through said lip portion in a forward direction at or above a first predetermined pressure level, closes to check flow through said lip portion at pressures between said first pressure level and a second predetermined pressure level, and said lip portion collapses, thereby opening said slit and permitting reverse flow through said lip portion at reverse flow pressures greater than said second pressure level.

2. The valve of claim 1 wherein said linear contour lies in a plane which is normal to a second plane containing said curve contour.

3. The valve of claim 2 wherein said slit extends along said curved contour.

4. The valve of claim 2 wherein said slit extends along said linear contour.

5. The valve of claim 3 or 4 wherein said slit intersects said central longitudinal axis.

6. The valve of claim 5 wherein said slit is radially symmetric with respect to said central longitudinal axis.

7. The valve of claim 6 wherein said curved contour is of substantially constant radius of curvature from said axis of curvature.

8. The valve of claim 7 further comprising means defining a flange extending about said lip portion and integral with said main body portion.

9. The valve of claim 4 further comprising stiffening means associated with said main body portion for increasing at least said first pressure differential.

10. The valve of claim 9 wherein said stiffening means comprises rib means extending along said main body portion.

11. The valve of claim 10 wherein said rib means are molded integrally with said main body portion.

12. The valve of claim 11 wherein said rib means project radially outwardly of said main body portion.

13. The valve of claim 12 wherein said rib means comprise a pair of diametrically positioned ribs.

14. A bi-directional pressure relief valve comprising:

a substantially cylindrical main body portion having a central longitudinal axis and defining a flow path through said valve;

said cylindrical main body portion terminating at one end thereof in a lip portion;

said lip portion having a curved contour of constant radius of curvature about an axis of curvature extending substantially perpendicularly to and intersecting said central longitudinal axis;

said lip portion having a linear contour perpendicular to said central longitudinal axis and parallel to said axis of curvature such that said lip portion is radially asymmetrical about said central longitudinal axis;

at least one normally closed slit formed in said lip portion and intersecting said central longitudinal axis; and said main body and lip portion being formed of elastomeric material such that said slit opens to permit flow through said lip portion in a forwad direction at or above a first predetermined pressure level, closes to check flow through said lip portion at pressures between said first pressure level and above a second predetermined pressure level, and said lip portion collapses, thereby opening said slit and permitting reverse flow through said lip portion at reverse flow pressures greater than said second pressure level.

* * * * *